United States Patent [19]

Ikuta et al.

[11] Patent Number: 4,477,874

[45] Date of Patent: Oct. 16, 1984

[54] CARD-OPERATED CONTROL SYSTEM FOR VEHICLE COMPONENTS

[75] Inventors: Hiroshi Ikuta, Okazaki; Takaaki Kato, Toyohashi, both of Japan

[73] Assignee: Nippondenso Co., Ltd., Kariya, Japan

[21] Appl. No.: 324,572

[22] Filed: Nov. 24, 1981

[30] Foreign Application Priority Data

Nov. 25, 1980 [JP] Japan .................... 55-165462

[51] Int. Cl.³ .................... B60R 25/04; B60R 25/10; G06F 15/20
[52] U.S. Cl. .................... 364/424; 340/825.31; 307/10 AT
[58] Field of Search .................... 364/425, 424; 340/64, 340/825.31; 307/10 AT

[56] References Cited

U.S. PATENT DOCUMENTS

| | | | |
|---|---|---|---|
| 3,803,551 | 4/1974 | Jordan | 340/825.31 X |
| 3,812,403 | 5/1974 | Gartner | 340/64 |
| 3,822,396 | 7/1974 | Watase et al. | 340/825.31 X |
| 4,204,255 | 5/1980 | Cremer | 364/425 |
| 4,206,491 | 6/1980 | Ligman et al. | 307/10 AT X |
| 4,240,516 | 12/1980 | Henderson et al. | 307/10 AT X |
| 4,327,353 | 4/1982 | Beard et al. | 340/64 |
| 4,366,466 | 12/1982 | Lutz | 340/825.31 X |
| 4,396,914 | 8/1983 | Aston | 340/825.31 |
| 4,404,632 | 9/1983 | Harada et al. | 364/425 |
| 4,434,468 | 2/1984 | Caddick et al. | 364/424 |

*Primary Examiner*—Gareth D. Shaw
*Assistant Examiner*—Ronni S. Malamud
*Attorney, Agent, or Firm*—Cushman, Darby & Cushman

[57] ABSTRACT

A card-operated system for controlling vehicle components is responsive to a magnetic card exclusively used by a particular user to control actuators associated with the vehicle components such as driver's seat position and the like. In the card is magnetically stored a set of driver's personal drive position data and security data which are read out by a magnetic card reader into a microprocessor-based controller. The controller analyzes the input data to operate the actuators according to the drive position data so that the driver is in an optimum drive position. The security data is also analyzed to identify the card if it represents the vehicle owner's card or a common user's who is authorized by the owner to use the vehicle but not authorized to have an access to a storage place where the owner's personal goods are stored. The vehicle engine is placed in a state of readiness for operation in response to the controller detecting an engine start code stored in the card as a security measure against vandalism to exclusively allow the user of the card to start the engine.

4 Claims, 3 Drawing Figures

CARD-OPERATED CONTROL SYSTEM FOR VEHICLE COMPONENTS

BACKGROUND OF THE INVENTION

The present invention relates to a novel control system for automotive vehicles using a driver's magnetic card to provide automatic adjustment of one or more controlled items of the vehicle components according to the driver's particular information recorded in the card and to provide security assurance against unauthorized use of the vehicle as well as the personal goods of the vehicle owner.

Conventionally, the driver has to manually adjust his or her seat position and mirror positions or the like according to his or her height prior to starting an automotive vehicle. This is particularly inconvenient from the operating standpoint where the vehicle is commonly used by several people. On the other hand, the engine and the trunk lid of the vehicle are also manually controlled by an ignition key and a control lever, respectively. This is undesirable from the security standpoint for the vehicle owner, for it is desirable to prevent an unauthorized user from starting the engine with a stolen ignition key or a similar tool and to ensure against unauthorized access to the trunk where the personal goods of the vehicle owner are stored.

SUMMARY OF THE INVENTION

The present invention contemplates the use of a magnetic card in which is recorded a set of driver's personal drive position data and security data. A card reader is provided to magnetically read the recorded information out of the card into a microprocessor-based controller. According to the personal drive position data the controller activates one or more actuators associated with vehicle component parts which include driver's seat, room and fender mirrors, or the like. For security purposes two types of magnetic card having different security data are available to permit the controller to identify the driver according to the security data. The first type of card is used by a vehicle owner and the second type of card by a common user or users who are authorized by the vehicle owner to use the vehicle but not allowed to have an access to the owner's personal goods. The controller checks the contents of the security data to allow the driver to have an access to a goods storage place if it identifies the card as the owner's or denies access thereto if it identifies otherwise. The driver, whether the vehicle owner or common user, is allowed to start the engine using an ignition key after the controller detects an engine operating data which is recorded in each card as a security item against vandalism. The use of the ignition key without using any of the cards thus prevents the engine from being started by an unauthorized person.

The card-operated control system of the invention thus ensures automatic precision adjustments of the vehicle components to the particular physical conditions of the driver each time he or she starts the vehicle. This provides an ideally custom-tailored driving condition which is particularly advantageous in situations where the vehicle is commonly used by several people.

BRIEF DESCRIPTION OF THE DRAWINGS

The invention will be described in further detail with reference to the accompanying drawings, in which.

DETAILED DESCRIPTION

Figure 1:
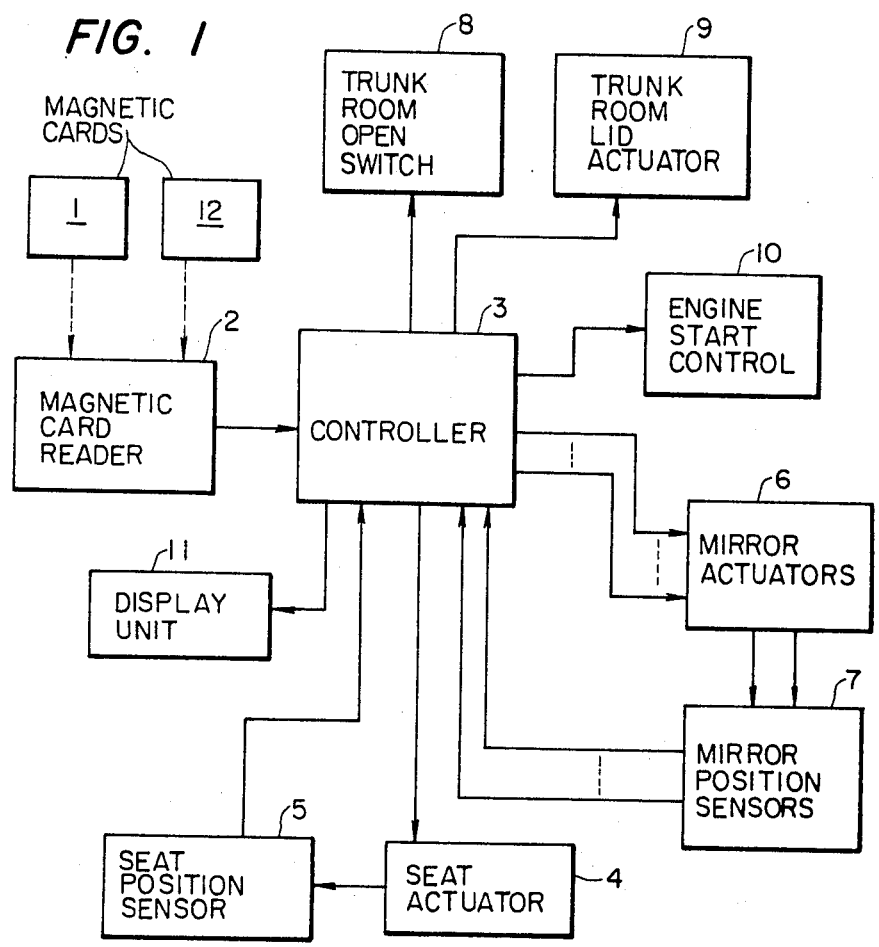
FIG. 1 is a block diagram of a preferred embodiment of the card-operated system for controlling vehicle components according to the invention.

Referring now to FIG. 1, there is shown a preferred embodiment of the magnetic card-operated vehicle control system of the invention in a schematic form. The system shown in FIG. 1 comprises a microprocessor-based controller 3 which receives input control data from a magnetic card reader 2, and a plurality of actuators which receive output signals from the controller 3. These actuators include a driver's seat actuator 4, mirror actuators 6, and a trunk lid actuator 9 which are respectively associated with a seat position sensor 5, mirror position sensors 7, and a trunk key switch 8 from each of which the controller 3 receives a feedback signal. An engine control circuit 10, which essentially comprises a coincidence gate, is provided to receive an engine enabling signal from the controller 3 to permit fuel injection pulses to be applied to an electronically fuel injected internal combustion engine, not shown.

The seat actuator 4 comprises a d.c. motor which is energized by a current supplied from the controller 3 for adjusting the driver's seat position. The seat position sensor 5 comprises a potentiometer having its sliding tap coupled to the rotor shaft of the actuator d.c. motor to provide a seat position signal to the controller 3. The mirror actuators 6 are respectively associated with the room mirror and fender mirrors, and each comprises a d.c. motor for adjusting the associated mirror position. Each of the mirror position sensors 7 also comprises a potentiometer having its slider tap coupled to the associated mirror position d.c. motor to provide a mirror position signal to the controller 3.

Figure 2:
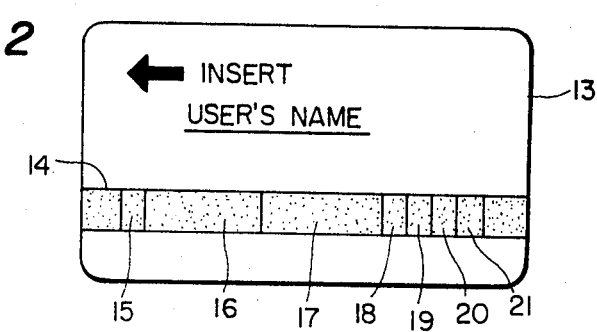
FIG. 2 is a sketch illustrating a magnetic card used in association with the card reader of FIG. 1.

At least two types of magnetic cards 1 and 12 are available for the vehicle users. As shown in FIG. 2, the magnetic card 1 comprises a rectangular sheet 13 of polyvinyl on which a strip of magnetic material 14 is deposited to serve as an information recording area which is divided into a plurality of storage locations designated 15 through 21. In the storage location 15 is recorded a 5-bit start-of-information code signifying the start position of the information data that follow and in the area 20 is recorded an end-of-information code signifying the end position of the information data. A 20-bit driver's seat position code is recorded in the first storage location 16 for storing information on the fore-and-aft position, height, backrest angle and headrest position of the driver's seat for an owner driver. In the storage location 17 is recorded a 20-bit mirror position code for storing information on the vertical and horizontal angular positions of the room mirror and fender mirrors. A 5-bit engine start security code is stored in the location 18 and a 5-bit trunk-room-unlock code signifying the permission of access to the trunk, is stored in the location 19 to exclusively allow the vehicle owner to open the trunk. A 5-bit parity check code is recorded in the storage location 21.

The magnetic card 12, on the other hand, is used exclusively by a person who is authorized by the vehicle owner to use the vehicle, but not authorized to have an access to his personal goods. The information stored in card 12 is similar to that stored in the owner's card 1 so that the driver's seat and mirror position data correspond to the particular user of the card 12. However, the data stored in area 19 is a trunk denial code signifying that the user is denied access to the trunk as a security measure for protecting the owner's personal goods.

The card-operated control system of the invention starts operating when either card 1 or 12 is inserted into the card reader 2 which reads off the stored information items in succession and places them into the controller 3.

Figure 3:
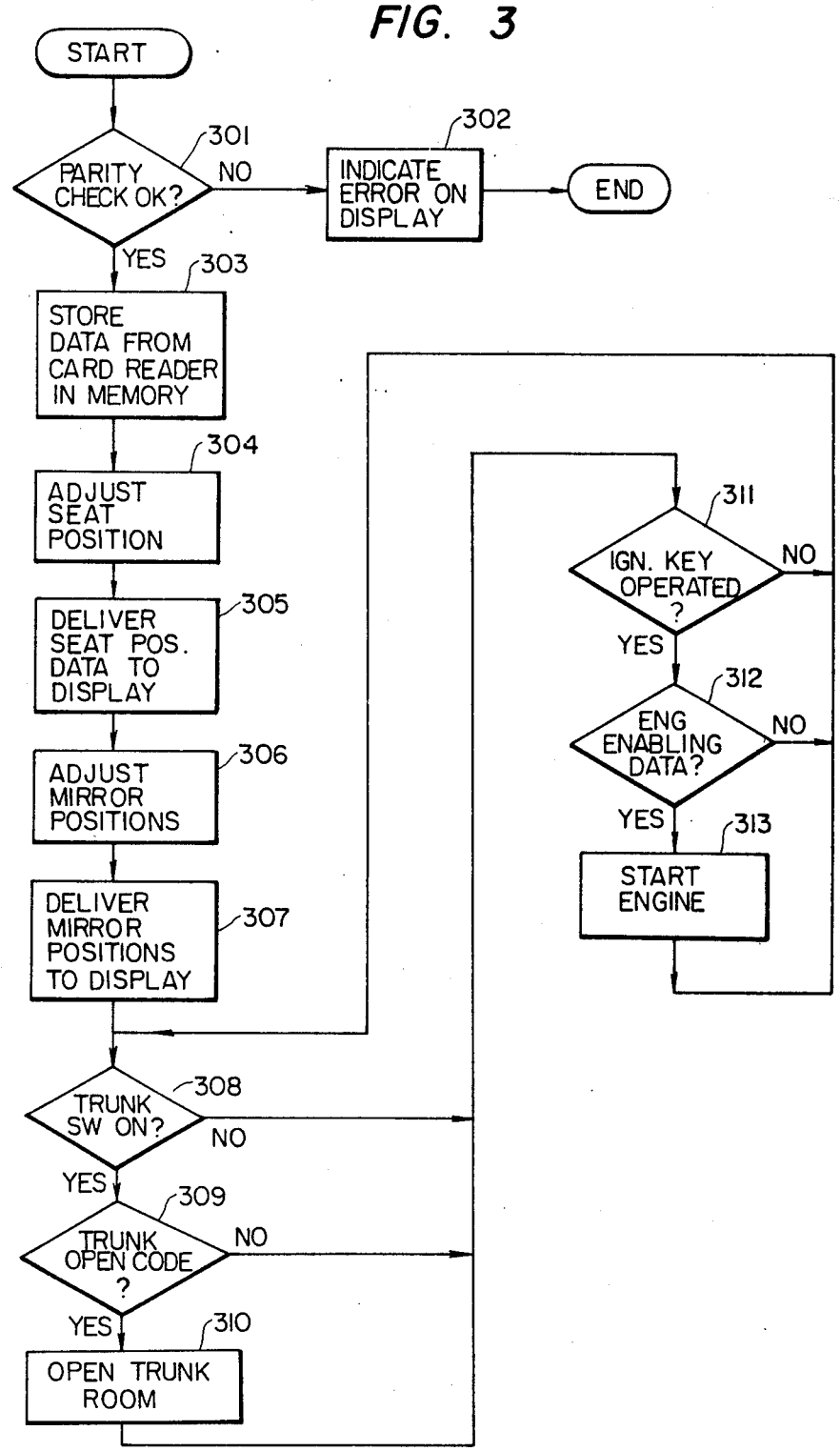
FIG. 3 is a flow diagram describing the process steps executed by the microprocessor-based controller of FIG. 1.

FIG. 3 is an illustration of the flow diagram of the program according to which the microprocessor-based controller 3 is preprogrammed. The controller 3 provides parity check at step 301 to ascertain whether the reading operation has been correctly performed. If there is an error in the read out data bits, a step 302 is executed to deliver an error indicating signal to a display unit 11. If no error is detected in the read out data, the latter is stored in respective storage locations of a memory at step 303. Subsequently, at step 304, the seat position data is read out of the memory to activate the seat actuator 4. The seat position sensor 5 detects the actual position of the driver's seat and feeds back the seat position signal to the controller 3. The controller 3 makes a comparison between the specified seat position data and the feedback data to adjust the driver's seat position until it reaches the specified position, whereupon the controller 3 proceeds to a step 305 to transmit seat position data to the display unit 11 to visually indicate the seat position of the driver.

Subsequently, the mirror position data is read out of the memory to automatically adjust the mirror positions in a manner similar to that of step 304 and the adjusted mirror positions are displayed on unit 11 at step 307 after the adjustments are made.

The controller 3 now goes to a step 308 to check to see if the trunk switch or lever has been operated and advances to a step 309 to check to see if a trunk permission code is present in the associated memory. If the inserted card is an owner's card 1, the trunk permission code is present and the controller 3 proceeds to a step 310 to actuate the trunk lid actuator 9 to open the trunk lid. If the inserted card is a non-owner's card 12, the trunk denial code is detected and the controller 3 refuses to open the trunk lid and proceeds to a step 311. At step 311 the controller 3 checks to see if the engine's ignition key has been operated or not. If operated, the controller advances to a step 312 to ascertain whether the engine start instruction data is present and if present, the controller 3 advances to a step 313 to deliver an engine enabling signal to the engine control circuit 10 to allow the driver to start the engine. This ensures the vehicle against vandalism by permitting the engine to respond exclusively to the controller output only when the card 1 or 12 is used and preventing it from being started when an unauthorized person attempts to start it with a stolen ignition key. If "no" decision is made at step 308 or 309, the step 311 is executed to check for the operation of the ignition key. After the engine is operated, or if "no" decision is made at step 311, or 312, the above process is repeated beginning the step 308.

The embodiment shown and described above is a preferred form of the invention. Various modifications and alterations are readily apparent to those skilled in the art. For example, the trunk usable state may be put on display and owner's goods stored in the passenger compartment can also be secured against unauthorized persons in the same manner as the trunk-open data. Furthermore, a desired shift pattern of an electronically controlled power transmission could also be stored in the card 1 or 12 to operate the vehicle according to the desired speed change pattern.

What is claimed is:

1. A control system for a vehicle having a lock-controlled engine and a lock-controlled trunk lid, comprising:
    a first card bearing security data items for authorizing a vehicle owner to unlock said lock-controlled engine and trunk lid;
    a second card bearing security data items for authorizing a user other than said vehicle owner to unlock said engine and unauthorizing the user to unlock said trunk lid;
    a card reader for receiving said cards one at a time to detect the data items from a said received card; and
    a controller for checking the detected engine and trunk-lid security data items against stored engine and trunk-lid authorize data items to detect a match therebetween and unlocking said engine and trunk lid when the detected engine and trunk-lid security data items match the stored authorize data items and keeping said trunk lid locked when the detected trunk-lid security data item mismatches the stored authorize data item.

2. A control system as claimed in claim 1, wherein each of said cards bears a parity check code and said controller is arranged to detect an error in said detected data items, and a display unit is provided to provide a visual display of said error.

3. A control system for a vehicle having a plurality of actuators including a mirror actuator and a seat actuator and a plurality of lock-controlled units including a lock-controlled engine and a lock-controlled trunk lid, comprising:
    a first card bearing personal data items of a vehicle owner indicating a seat position and a mirror position and security data items for authorizing the vehicle owner to unlock said lock-controlled units;
    a second card bearing personal data items of a user other than said vehicle owner indicating a seat position and a mirror position and security data items for authorizing the user to unlock said engine and unauthorizing the user to unlock said trunk lid;
    a card reader for receiving said cards one at a time to detect the data items from a said received card; and
    a controller for providing seat position and mirror position control signals to said seat and mirror actuators respectively in response to the detected personal data items and checking the detected engine and trunk-lid security data items against stored engine and trunk-lid authorize data items to detect a match therebetween and unlocking said engine and trunk lid when the detected engine and trunk-lid security data items match the stored authorize data items and keeping said trunk lid locked when the detected trunk-lid security data item mismatches the stored authorize data item.

4. A control system as claimed in claim 3, wherein each of said cards bears a parity check code and said controller is arranged to detect an error in said detected data items, and a display unit is provided to provide a visual display of said error.

* * * * *